United States Patent [19]
Smith et al.

[11] Patent Number: 5,411,289
[45] Date of Patent: May 2, 1995

[54] AIR BAG SYSTEM FOR A MOTOR VEHICLE

[75] Inventors: Bradley W. Smith, Odgen; James D. Erickson, North Ogden, both of Utah; Patrick D. Jamison, Ludwigsburg, Germany; Peter A. Tyroller, Kirchheim/T., Germany; Dietrich Bergfried, Boeblingen; Bernhard Mattes, Sachsenheim, Germany; Werner Nitschke, Ditzingen, Germany

[73] Assignee: Morton International, Inc., Chicago, Ill.

[21] Appl. No.: 149,296

[22] Filed: Oct. 29, 1993

[51] Int. Cl.6 .............................. B60R 21/32
[52] U.S. Cl. .............................. 280/735; 280/728.1; 180/271
[58] Field of Search .............. 280/728 R, 735, 736 R, 280/742; 180/271-274

[56] References Cited

U.S. PATENT DOCUMENTS

| | | | |
|---|---|---|---|
| 3,672,699 | 6/1972 | De Windt | 280/735 |
| 3,767,002 | 10/1973 | Gillund | 290/236 |
| 3,767,228 | 10/1973 | Lewis | 280/735 |
| 3,966,224 | 6/1976 | Campbell et al. | 280/735 |
| 4,243,248 | 1/1981 | Scholz et al. | 280/735 |
| 4,620,721 | 11/1986 | Scholz et al. | 280/735 |
| 4,984,651 | 1/1991 | Grosch et al. | 180/268 |
| 5,071,160 | 12/1991 | White et al. | 280/735 |
| 5,074,583 | 12/1991 | Fujita et al. | 280/735 |
| 5,078,422 | 1/1992 | Hamilton et al. | 280/736 |
| 5,122,954 | 1/1992 | Okano | 280/735 |
| 5,184,845 | 2/1993 | Omura | 280/735 |
| 5,232,243 | 8/1993 | Blackburn et al. | 280/728 |
| 5,234,228 | 8/1993 | Morota et al. | 180/273 X |
| 5,301,772 | 4/1994 | Honda | 280/735 X |
| 5,330,226 | 7/1994 | Gentry et al. | 280/735 |

FOREIGN PATENT DOCUMENTS 4092738 3/1992 Japan .................. 280/735

Primary Examiner—Margaret A. Focarino
Assistant Examiner—Christopher P. Ellis
Attorney, Agent, or Firm—Mason, Kolemainen, Rathburn & Wyss

[57] ABSTRACT

An air bag system is provided for use in a motor vehicle. The air bag system includes at least one air bag module. A multiple level gas generation source is coupled to the air bag module for generating a selected gas generation level applied to the air bag module. An electronic control unit controls the operation of multiple level gas generation source. At least one temperature sensor is coupled to the electronic control unit for sensing ambient temperature. At least one seat belt sensor is coupled to the electronic control unit for sensing seat belt usage. An acceleration sensor is coupled to the electronic control unit for sensing deceleration during a crash. The electronic control unit is responsive to a combination of sensed inputs from the temperature sensor, the seat belt sensor and the acceleration sensor for determining both an optimum gas generation level and inflation sequence times for controlling the multiple level gas generation source.

14 Claims, 9 Drawing Sheets

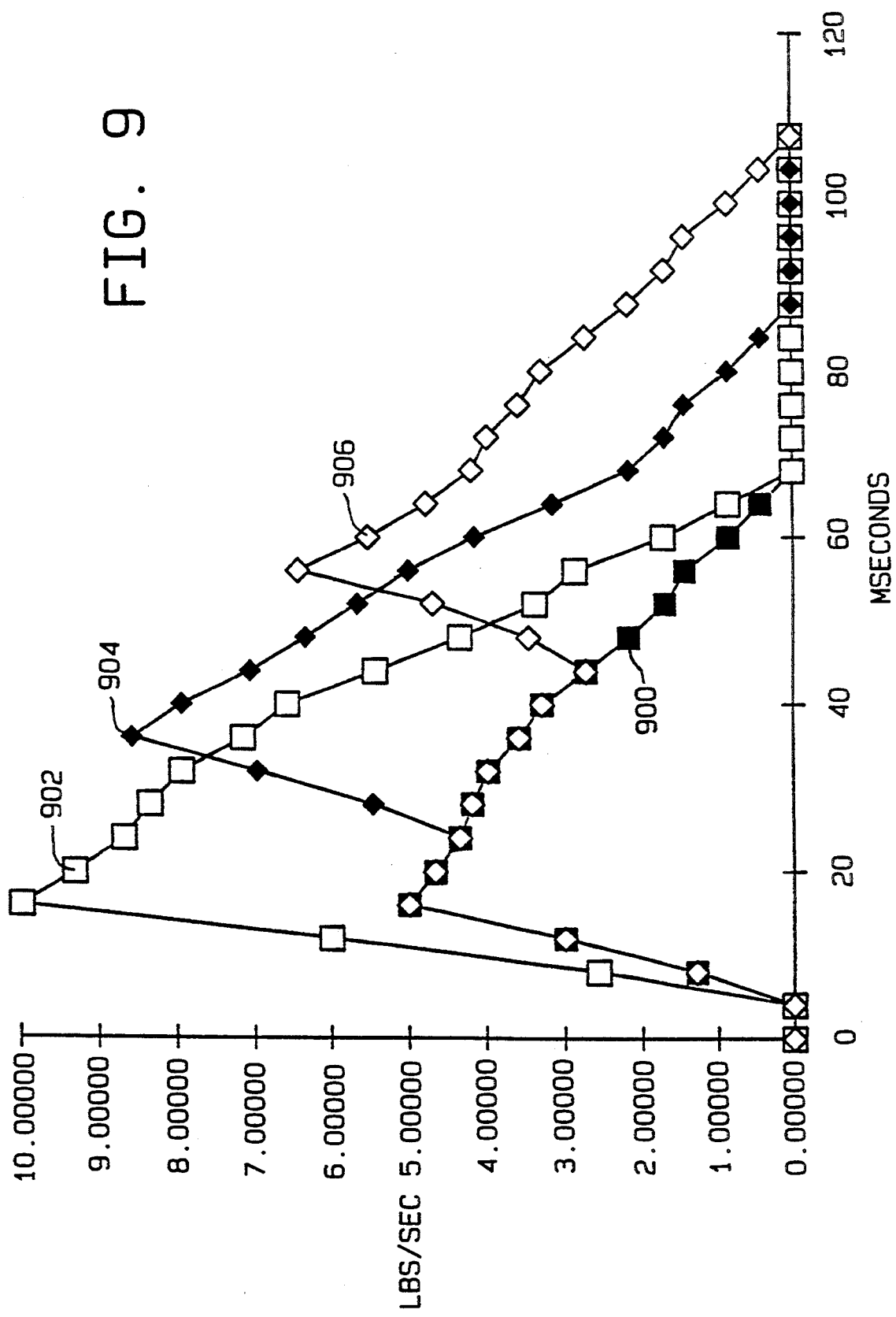

AIR BAG SYSTEM FOR A MOTOR VEHICLE

BACKGROUND OF THE INVENTION

1. Field of the Invention

The present invention relates to air bag safety systems for motor vehicles, and more particularly to an air bag system including an electronic control unit for controlling inflation of an air bag.

2. Description of the Prior Art

Various arrangements are known in the art for protecting the occupants of an automotive vehicle during collisions with air bags.

For example, U.S. Pat. No. 5,232,243 discloses an occupant sensing apparatus for use in an occupant restraint system. The disclosed occupant sensing apparatus preferably monitors the passenger seat in the vehicle to detect the presence on an object in the seat, the position of the object and the weight of the object. A control algorithm is performed to control air bag inflation responsive to the detected values.

U.S. Pat. No. 4,243,248 discloses an air bag system including air bags for the driver and a front seat passenger. In the disclosed air bag system, the passenger side air bag can be inflated in two stages in response to an output signal generated from a sensor system when deceleration reaches first and second thresholds.

U.S. Pat. No. 3,767,228 discloses apparatus for controlling the operation of air bag inflation dependent on ambient temperature within the vehicle in which the apparatus is disposed.

U.S. Pat. No. 5,074,583 discloses an air bag system for an automobile including a seating condition sensor that detects a seating condition of a passenger with respect to seat position, reclining angle, passenger size and posture. The air bag is operated in accordance with the seating condition of the passenger so that the inflated air bag is brought into optimal contact with the occupant.

U.S. Pat. No. 4,984,651 discloses a passenger restraint system for motor vehicles including a switch member that detects the functional position of the safety belt. Activation of an air bag and a belt tensioner is dependent on the functional position of the safety belt.

U.S. Pat. No. 5,071,160 discloses a sensor for detecting the position of the passenger to effect deployment of the air bag to provide optimum protection for the passenger.

U.S. Pat. No. 3,672,699 discloses an automatic restraint system arming control of an air bag dependent on the presence of an occupant to effect inflation of the air bag. If no occupant is present, the air bag is not inflated.

U.S. Pat. No. 4,620,721 discloses an air bag system that also is responsive to the driver's use of a seat belt. The difference is that the threshold speed differs depending on the driver's use of the belt.

U.S. Pat. No. 3,767,002 discloses a seat occupancy responsive air cushion actuation and monitoring circuit that determines passenger occupancy before firing a squib which controls inflation of the air bag.

U.S. Pat. No. 3,966,224 discloses a multiple inflation rate air bag system using an air-augmented inflator which is activated in various manners in accordance with the occurrence of predetermined levels of intensity of impact to provide the multiple rates of inflation.

A need exists for an air bag system that functions optimally over a larger range of crash situations and better than is currently possible with known air bag systems.

SUMMARY OF THE INVENTION

Among the principal objects of the present invention are to provide an improved air bag system; to provide such an air bag system that optimizes the air bag response to multiple detected variables and various crash situations using an electronic control unit and multiple level gas generation sources for inflating each air bag and to provide an air bag system overcoming many of the disadvantages of known air bag control arrangements.

In brief, the objects and advantages of the present invention are achieved by an air bag system for a motor vehicle. The air bag system includes at least one air bag module. A multiple level gas generation source is coupled to the air bag module for generating a selected gas generation level applied to the air bag module. An electronic control unit controls the operation of multiple level gas generation source. At least one temperature sensor is coupled to the electronic control unit for sensing ambient temperature. At least one seat belt sensor is coupled to the electronic control unit for sensing seat belt usage. An acceleration sensor is coupled to the electronic control unit for sensing deceleration. The electronic control unit is responsive to a combination of sensed inputs from the temperature sensor, the seat belt sensor and the acceleration sensor for determining an optimum gas generation level and inflation sequence times for controlling the multiple level gas generation source.

BRIEF DESCRIPTION OF THE DRAWING

These and other objects and advantages of the present invention will become readily apparent upon consideration of the following detailed description and attached drawing, wherein:

FIG. 9 is a graph illustrating approximate mass flow rates for the curves of FIG. 7.

DETAILED DESCRIPTION OF THE PREFERRED EMBODIMENT

Figure 1:
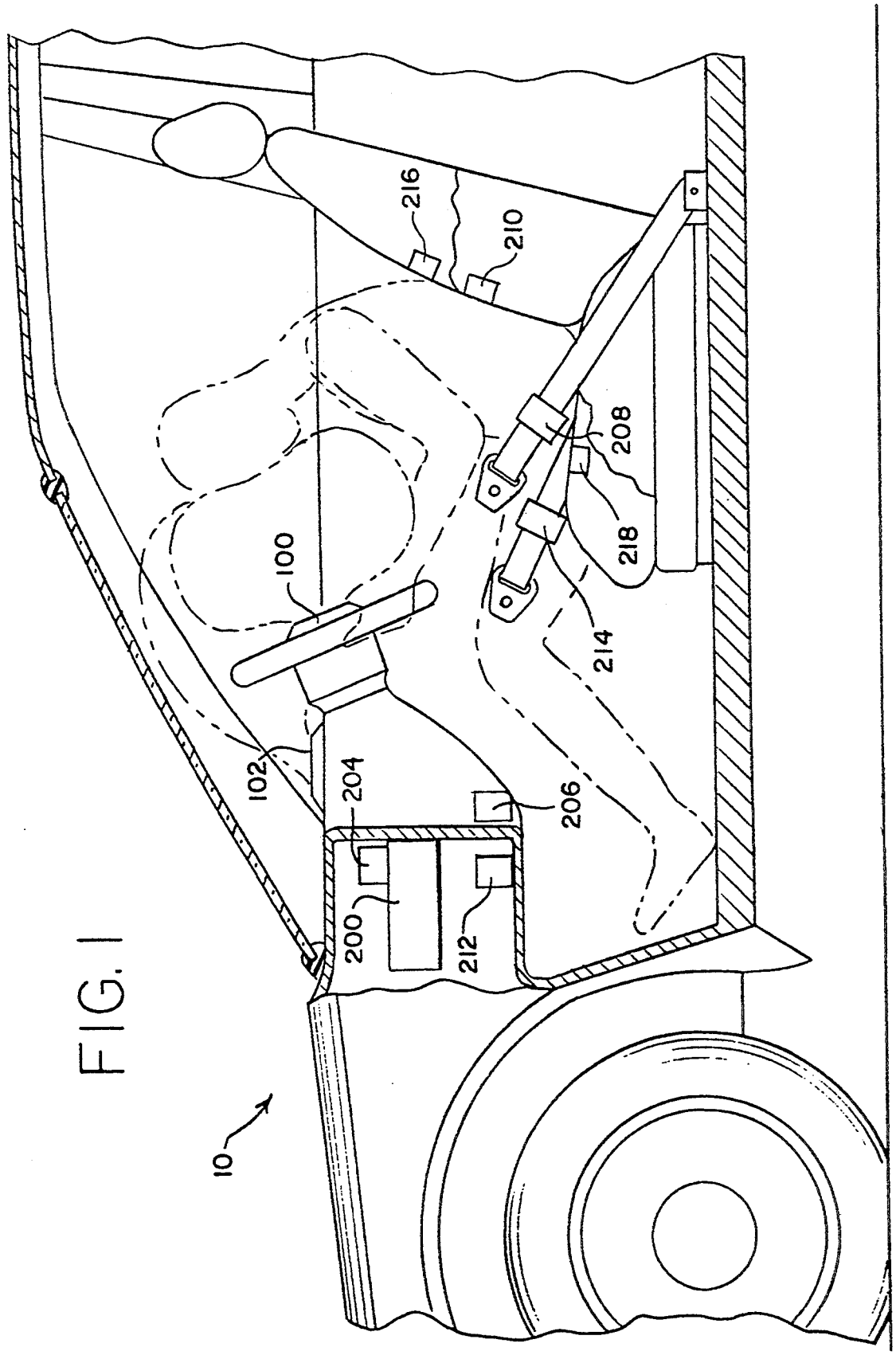
FIG. 1 is a perspective view of a vehicle including an air bag system of the invention.

Referring to FIG. 1, an air bag system 10 is illustrated in conjunction with an automotive vehicle. As shown in FIG. 1, the air bag system 10 includes an air bag module 100 on the driver's side and an air bag module 102 on the passenger's side. An electronic control unit (ECU) 200 and a plurality of sensors 204, 206, 208, 210, 212, 214, 216 and 218 are illustrated within the vehicle.

French patent application No. 92 09829 by Allard et al., filed Aug. 7, 1992, discloses an air bag enclosure for a driver's side air bag module of the type advantageously used for the air bag module 100. U.S. patent application Ser. No. 08/101,617 to Hansen et al., filed Aug. 3, 1993, discloses an inflatable air bag module of the type advantageously used for the passenger's side air bag module 102. The subject matter of the above-identified French and U.S. patent applications is incorporated herein by reference.

Figure 2:
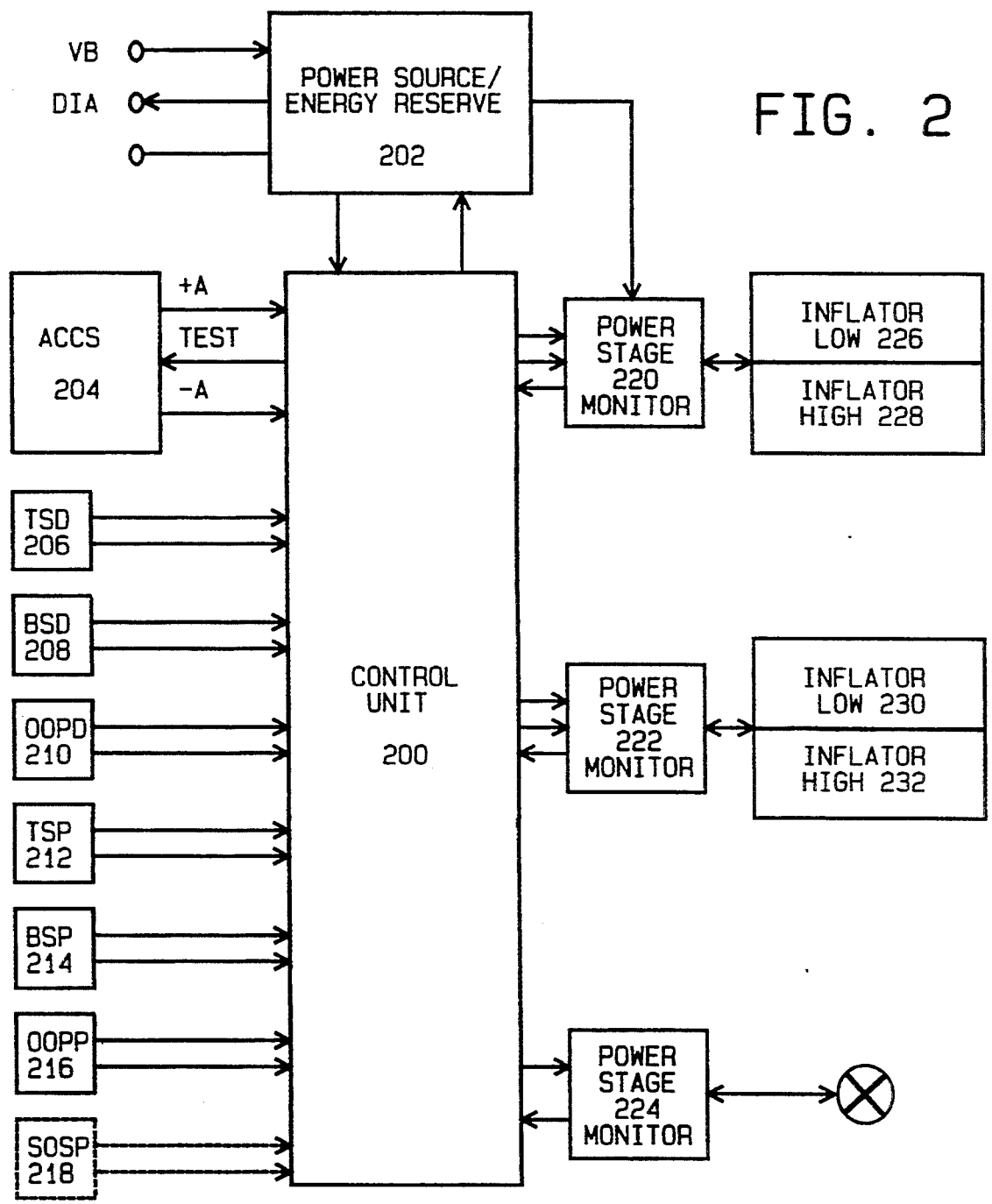
FIG. 2 is a block diagram representation of the air bag system of FIG. 1.

Referring also to FIG. 2, the multiple sensors include an acceleration sensor (ACCS) 204; a temperature sensor driver (TSD) 206; a temperature sensor passenger (TSP) 212; a buckle switch driver (BSD) 208; a buckle switch passenger (BSP) 214; an out-of-position sensor driver (OOPD) 210; an out-of-position sensor passenger (OOPP) 216 and an optional seat occupancy sensor passenger (SOSP) 218. Thermocouples or negative temperature coefficient (NTC) resistors can be used for the temperature sensor 206 and 212. Belt lock contacts with parallel and serial resistors for analog evaluation and fault detection possibility can be used for buckle switch sensors 208 and 214. A microwave radar sensor or similar device can be used for the out-of-position sensors 210 and 216. Capacitive sensor measuring stray capacitance between back rest and seating elements to be used as capacitance-electrodes for the seat occupancy sensor passenger 218. If an OOPP 216 is used, SOSP 218 can be eliminated.

ECU 200 advantageously is mounted in the vehicle interior, avoiding the outside harsh environment. Typically ECU 200 is located near the driver or alternatively in the rear of the vehicle and preferably symmetrically located. It should be understood that the actual location of the ECU 200 or the external acceleration sensor 204 is based on optimum signal location for a specific vehicle application. ECU 200 can contain a dual accelerometer, piezoelectric or silicon micromachined type (ACCS) 204 for measuring the deceleration during an impact. The acceleration signals are processed by a microcontroller or electronic control unit 200 according to a specific algorithm based on physical quantities and methods of the invention.

A power source and energy reserve 202 coupled to the ECU 200 includes, for example, a 12 volt DC battery and a capacitor that is capable of supplying the unit with energy during a normal crash period, such as about 150 milliseconds. A plurality of power stages 220, 222 and 224 coupled to the ECU 200 are capable of supplying energy for firing commercially available squibs or gas inflators, for example, 4 mJ, 14 mJ, or 36 mJ devices. The monitor included with power stages 220, 222 and 224 monitors failure modes of the power stages and subsequent gas generation blocks 226, 228, 230 and 232 checking for compliance to specified normal operational values. Any indications of failure to meet specified operational values are indicated to the driver by a warning lamp coupled to the output of power stage and monitor block 224. Specific failure identification can be obtained digitally from the microcontroller or ECU 200.

Actual optimization of the system 10 is achieved by using multiple level gas generation sources 226, 228 and 230, 232 for the driver's side and the passenger's side and the electronic control unit (ECU) 200, which identifies the crash situation together with multiple detected variables. ECU 200 selects the most appropriate gas generation level and inflation sequence times to tailor the system's performance to the crash severity being experienced.

In FIG. 2, two-level gas generator source including low and high inflator sources 226, 228 for the driver's side and low and high inflator sources 230, 232 for the passenger's side is illustrated in simplified form sufficient for an understanding of the present invention, because the utility of the present invention is not limited to the details of a particular number or level of gas generation sources.

Air bag system 10 utilizes inputs to identify crash severity, temperature, occupant presence, occupant position and seat belt usage to optimize the air bag system's performance to the actual crash situation. ECU 200 performs signal processing of acceleration signals together with analyzing multiple predetermined inputs to determine the functionality of the system and vehicle/occupant situations. The acceleration sensor 204 can be located inside the ECU 200 as an integrated central sensing function or externally in the front of the vehicle. Other inputs to the ECU 200, such as the sensors 208 and 214 for seat belt usage by the driver and passenger, and inflator temperature sensors 206 and 212 for the driver and passenger, are external to the ECU.

Multiple level inflator function can be created by firing two or more gas generators 226, 228, 230, 232 together or in series; or by a single gas generator capable of multiple pulses actuated by separate means.

Figure 3:
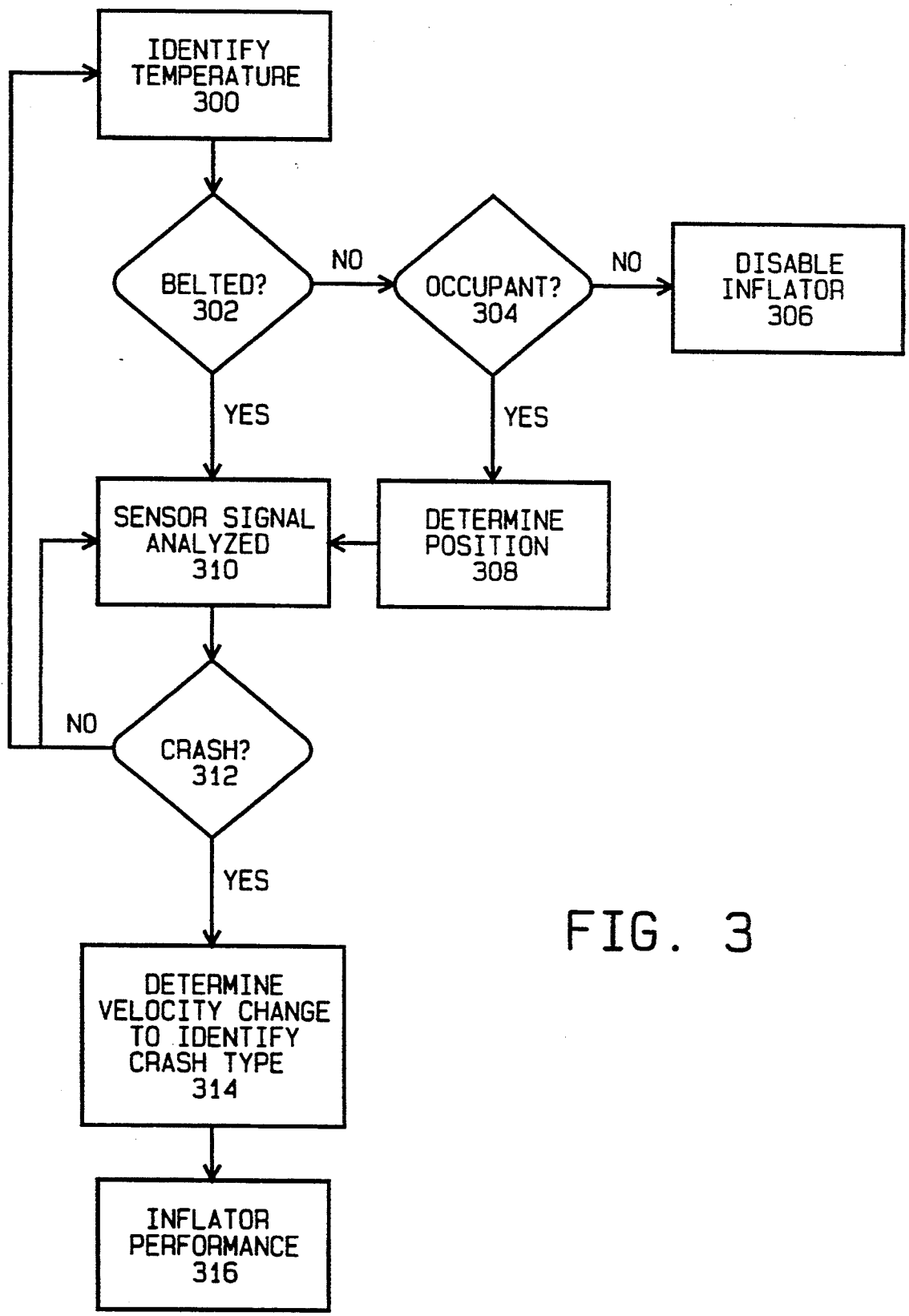
FIG. 3 is a flow chart illustrating sequential steps performed by an electronic control unit of the air bag system of FIG. 1.
Figure 4:
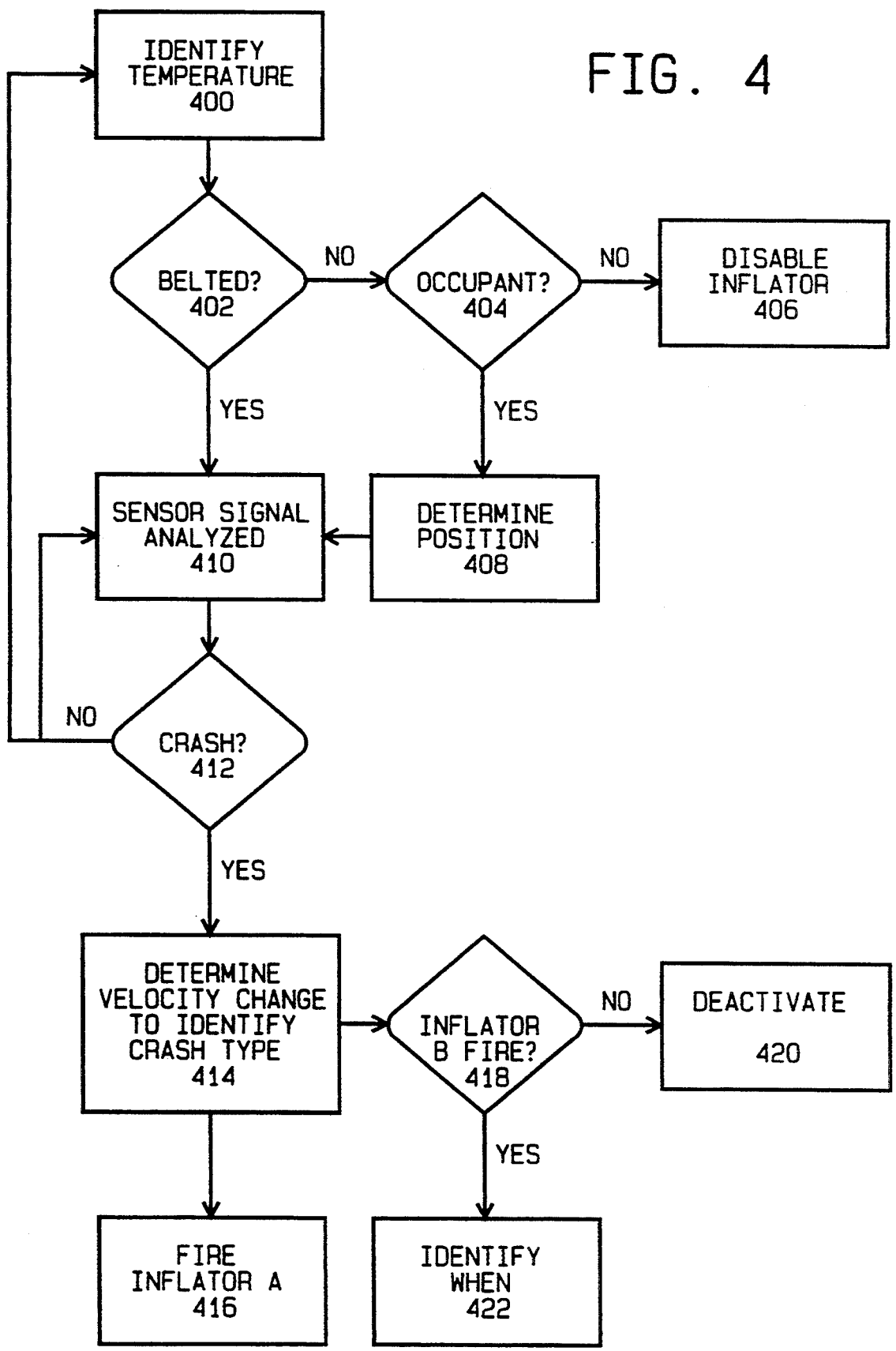
FIG. 4 is a flow chart illustrating alternative sequential steps performed by an electronic control unit of the air bag system of FIG. 1.

Referring now to FIGS. 3 and 4, there are shown flow charts of sequential operations performed by the ECU 200 for identifying a crash situation based upon the crash severity algorithm for determining inflator firing and firing times.

First temperature is identified as indicated at a block 300 in FIG. 3 and a block 400 in FIG. 4. Next seat belt use and occupant presence are periodically monitored as indicated at a pair of sequential decision blocks 302 and 304 in FIG. 3 and 402 and 404 in FIG. 4. When seat belt use is not identified at blocks 302 and 402, then occupant presence is checked at decision blocks 304 and 404. When determined at a respective decision block 304 or 404 that an occupant is not present, then the inflator is disabled as indicated at a block 306 in FIG. 3 and a block 406 in FIG. 4. Otherwise, when an occupant is identified as being present, then passenger position is determined as indicated at a block 308 in FIG. 3 and a block 408 in FIG. 4.

ECU 200 monitors the acceleration signal inputs to determine crash occurrence and severity as indicated at sequential blocks 310, 312 and 314 in FIG. 3 and blocks 410, 412 and 414 in FIG. 4. A crash is identified at decision blocks 312 and 412 based upon a detected signal from the ACCS 204 exceeding a predetermined signal threshold and predefined customer specified parameters. When a dual accelerometer 204 is used, only when both independent sensor channels transfer signals which are high enough to exceed the predetermined release threshold is a firing of the inflators initiated.

With the multiple level gas generator system, based upon the identified temperature, seat belt use, and/or occupant position, and the crash severity or crash type is identified based upon a determined velocity change at block 314, then the appropriate inflator firing sequence is determined and implemented as indicated at a block 316 labelled INFLATOR PERFORMANCE.

The algorithm of the invention has predictive properties for calculation of the passenger compartment's velocity change and of the occupant's forward displacement at the time t+Dt. If t+Dt is the time at which the maximum allowable forward displacement will be reached, for example, five (5) inches, then t is the time to fire (ttf). Depending on the value of Dt, the crash severity can be predicted and the delay time between the activation of the two-level inflator chosen. For example, for Dt=30 msec, simultaneous inflation is required; and for Dt=50 msec, a delay between the firing of the two inflators will be necessary.

In FIG. 4 sequential operations are shown for use with a two-level gas generator system using an inflator A and inflator B corresponding to level A and level B. Responsive to an identified velocity change used to identify at block 414, inflator A is fired immediately as indicated at a block 416. At a decision block 418, it is determined whether inflator B should be fired responsive to the identified velocity change and crash type identified at block 414. If determined that inflator B should not be fired, then inflator B is deactivated as indicated at a block 420. If inflator B should be fired, then the firing time is determined for when inflator B should be fired as indicted at a block 422. Two methods of firing the two gas generation levels are available, including DC and AC firing arrangements.

Figure 5:
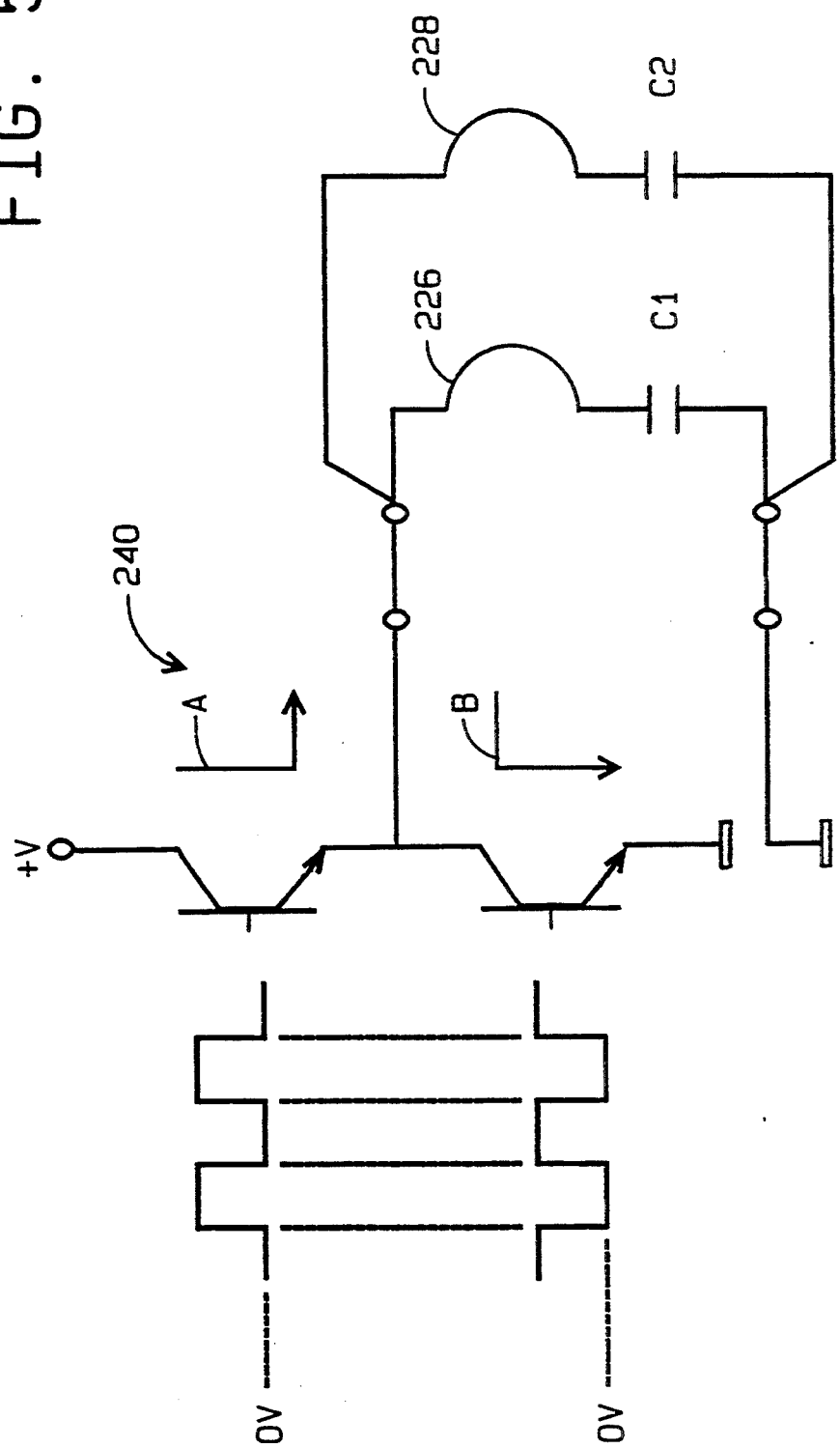
FIG. 5 is an electrical schematic diagram representation of an inflator firing circuit of the air bag system of FIG. 1.

Referring to FIG. 5, an AC firing pair of small capacitors C1, C2 is connected in series to a respective one of the low and high inflators 226 and 228. An output stage for AC firing consists of a push/pull transistor stage 240 coupled to a power supply +V, for example, supplied by an electrolytic capacitor which is charged up to approximately 45 Volts. This push/pull stage 240 is complementarily activated by a burst of pulses as shown at the base input of the pair of NPN transistors in FIG. 5.

In operation during a first half period C1, C2 are charged to approximately 40 V, direction of current flow is indicated by arrow A. In the second half period, the current flow is indicated by arrow B. That means the squibs are activated by an AC current. The number of periods for firing the squibs depends on the size of C1, respectively C2.

Example: If
C1=0.47 $\mu$F,
C2=0.047 $\mu$F,
Ignition energy for the inflators—4 mJ,
specific energy via C1=(0.4 ... 0.8) mJ/period,
specific energy via C2=(0.04 ... 0.08) mJ/period,
$t_{period}$=16 $\mu$s, then
firing time for squib low $t_{f1}$=(150 ... 300) $\mu$sec,
for squib high $t_{f2}$=(1.5 ... 3) msec.

The number of activation periods of the push/pull stage determines, which inflator is fired, for example:
$t_{act1}$=0.4 msec=25 periods, only squib low is fired.
$t_{act2}$=4 msec=250 periods, both squibs are fired.

That means for $t_{act2}$=4 msec=250 periods, squib low 226 is fired after 0.4 msec at the latest and squib high 228 is fired after 4 msec at the latest. Any delay time can be selected by the ECU 200 according to the requirements of crash severity and of the external sensors. E.g., if the ECU 200 requires a delay time of 10 msec between squib high and squib low, the push pull output stage 240 is first activated for $t_{act1}$=0.4 msec to fire squib low 226, then shut off for 10 msec minus $t_{act2}$. After waiting this determined period of time (6 msec), the push pull output stage 240 is reactivated for $t_{act2}$=4 msec in order to fire squib high 228. Thereby any desired delay time beyond the system minimum 3.6 msec ($t_{act2}-t_{act1}$) can be provided.

So with one push/pull output stage 240 and different capacitance values of C1, C2, two squibs can be fired with variable delay time connected only via two wires to the air bag module as shown in FIG. 5.

Figure 6:
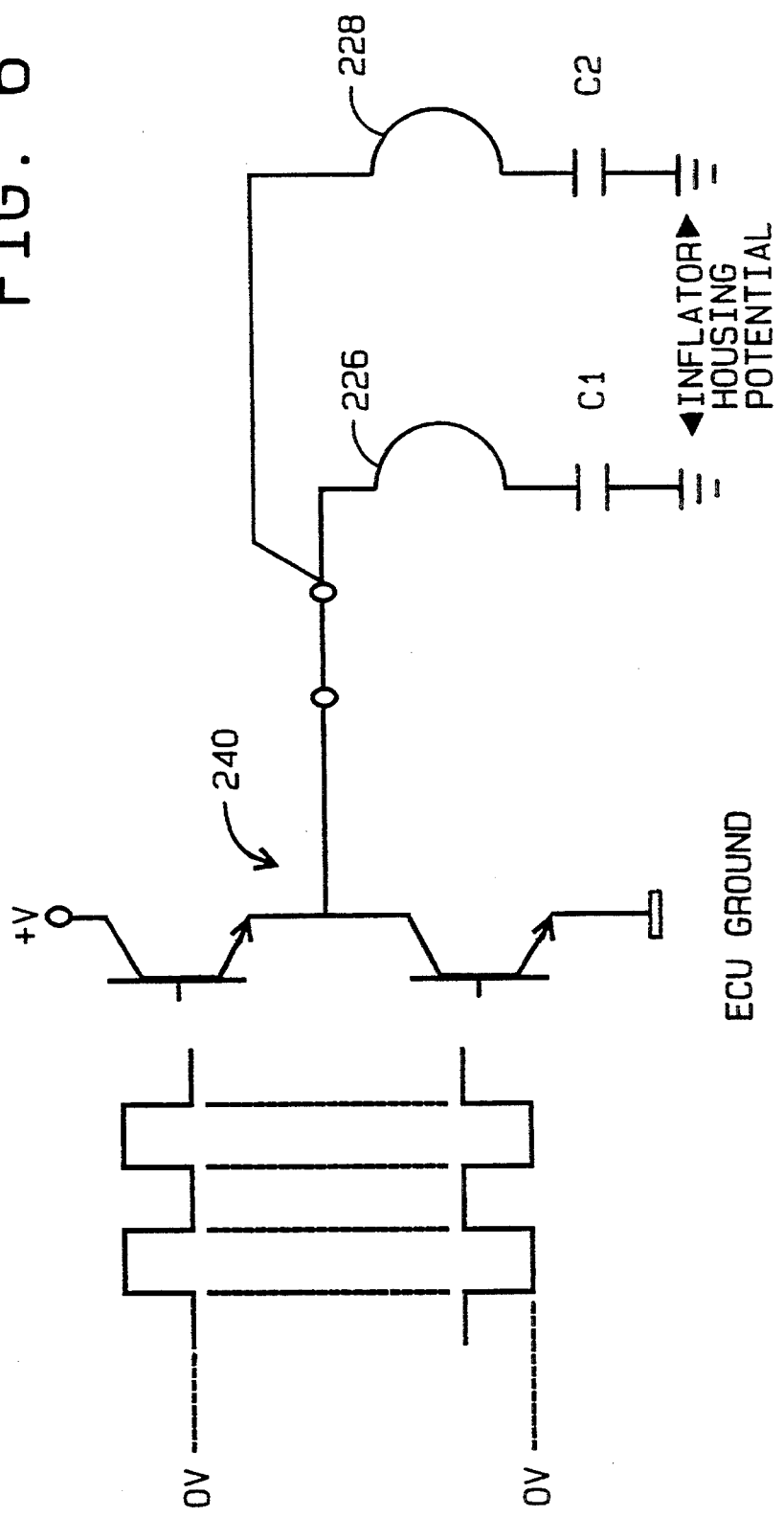
FIG. 6 is an electrical schematic diagram representation of an alternative inflator firing circuit of the air bag system of FIG. 1.

In FIG. 6, a single wire firing arrangement for two squibs with one push/pull stage 240 and different C1, C2 is illustrated. For firing it is not relevant which potential difference between ECU ground and the inflator housing potential exists. This can be chassis ground or $V_{battery}$. It must only be a low impedance, for example, less than 100 milliohms connection to a current sink, which can take approximately a current of 3 Amperes.

Some types of squibs 226, 228, 230, 232 contain a small printed circuit board (not shown), on which the ceramic chip capacitor C1 or C2 could be soldered with one electrode connected to the electrical initiation element, the other one to the housing of the squib. By this arrangement a one wire ignition is possible.

Advantages of AC firing include immunity against short circuits to DC vehicle voltages; safety against unwanted release in case of a power stage failure plus a short circuit to ground in the ignition loop; and independence of the firing possibility from variations of the ignition loop resistance. A change in the loop resistance from 2 ohms to 12 ohms does not cause any significant difference in the firing possibility.

Ignition loop monitoring can detect if one or both squibs are shorted or interrupted and if C1 and/or C2 is shorted or interrupted.

Figure 7:
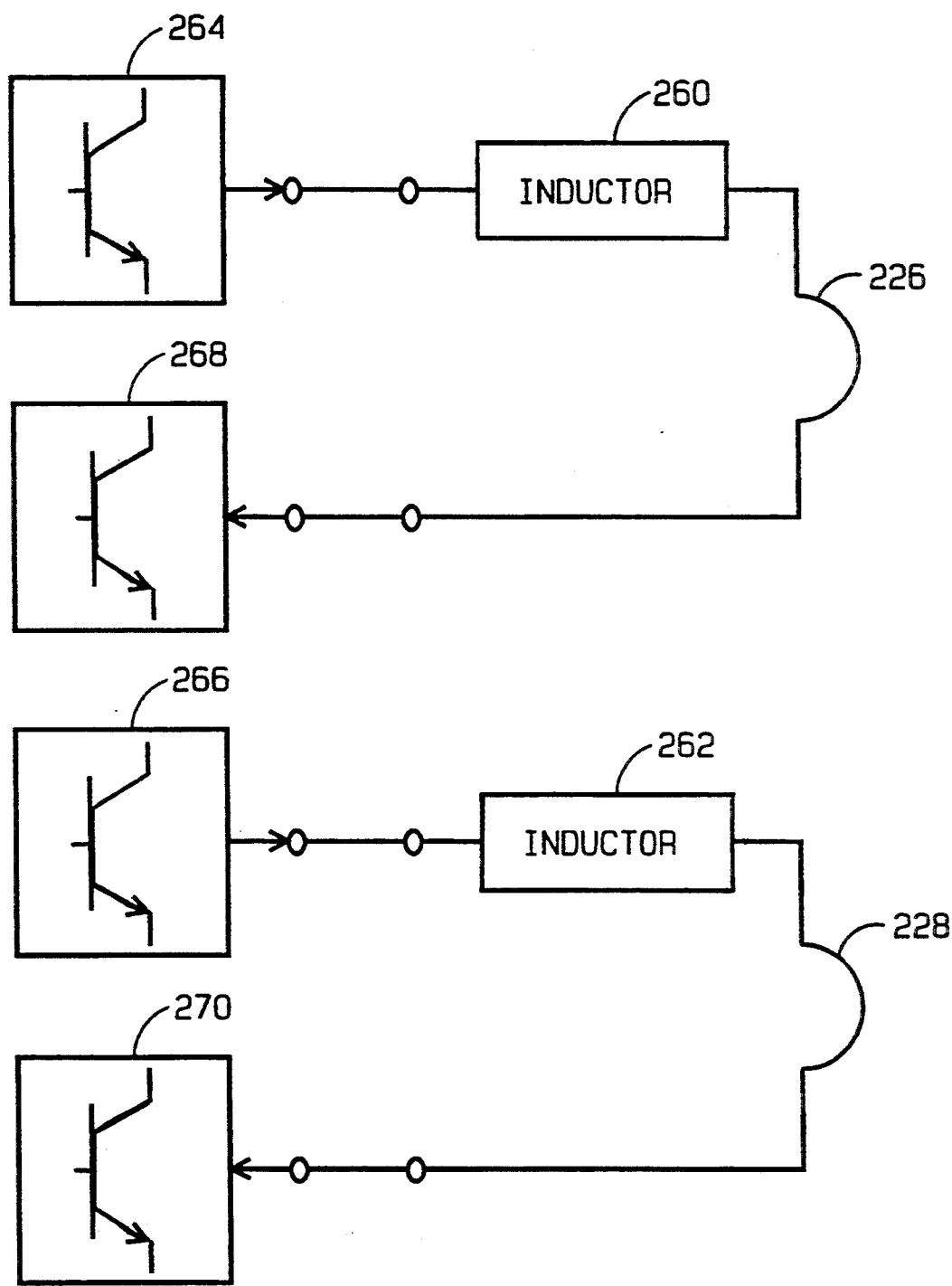
FIG. 7 is an electrical schematic diagram representation of another alternative inflator firing circuit of the air bag system of FIG. 1.

FIG. 7 illustrates a DC firing circuit including an inductor 260, 262 connected in series to a respective one of the low and high inflators 226 and 228. A high side output stage 264, 266 and a low side output stage 268, 270 are connected in series to a respective one of the low and high inflators 226 and 228. With the DC firing arrangement, additional circuitry (not shown) is used for ignition loop diagnostics.

Options 1 and 2 for the system 10 are provided below in Tables 1 and 2. Option 1 has variables including temperature, crash severity and seat belt status. Option 2 also includes additional variables of occupant presence and occupant position.

Table 1 illustrates the Option 1 variable input used to optimize air bag system performance. Table 2 shows the Option 2 input used to optimize air bag system performance. Exact delay time requirements will vary depending on vehicle characteristics however short would be approximately 5 to 15 milliseconds, moderate would be approximately 10 to 50 milliseconds, and long would be approximately 20 to 100 milliseconds.

TABLE 1

AIR BAG SYSTEM - OPTION 1

| SCENARIO | TEMPERATURE AMB | TEMPERATURE HOT | TEMPERATURE COLD | CRASH SEVERITY LOW* | CRASH SEVERITY HIGH | OCCUPANT BELTED YES | OCCUPANT BELTED NO | INFLATOR LEVEL DEPLOYED LOW | INFLATOR LEVEL DEPLOYED HIGH | PULSE DELAY |
|---|---|---|---|---|---|---|---|---|---|---|
| 1 | X | | | | X | X | | YES | YES | MOD |
| 2 | X | | | | X | | X | YES | YES | SHORT |
| 3 | X | | | X | | X | | YES | NO | |
| 4 | X | | | X | | | X | YES | YES | MOD |
| 5 | | X | | | X | X | | YES | YES | LONG |
| 6 | | X | | | X | | X | YES | YES | MOD |
| 7 | | X | | X | | X | | YES | NO | |
| 8 | | X | | X | | | X | YES | YES | LONG |
| 9 | | | X | | X | X | | YES | YES | SHORT |
| 10 | | | X | | X | | X | YES | YES | NONE |
| 11 | | | X | X | | X | | YES | NO | |
| 12 | | | X | X | | | X | YES | YES | SHORT |

*If at any time during delay period the severity crossed the trip point for high severity the initiation of high deployment level reverts to high severity delay.

TABLE 2

AIR BAG SYSTEM - OPTION 2

| SCENARIO | TEMPERATURE AMB | TEMPERATURE HOT | TEMPERATURE COLD | CRASH SEVERITY LOW | CRASH SEVERITY HIGH | OCCUPANT A | OCCUPANT B | OCCUPANT C | OCCUPANT D | INFLATOR LEVEL DEPLOYED LOW | INFLATOR LEVEL DEPLOYED HIGH | PULSE DELAY |
|---|---|---|---|---|---|---|---|---|---|---|---|---|
| 1 | X | | | | X | X | | | | NO | NO | |
| 2 | X | | | | X | | X | | | YES | YES | MOD |
| 3 | X | | | | X | | | X | | YES | YES | SHORT |
| 4 | X | | | | X | | | | X | YES | YES | MOD |
| 5 | X | | | X | | X | | | | NO | NO | |
| 6 | X | | | X | | | X | | | YES | NO | |
| 7 | X | | | X | | | | X | | YES | YES | MOD |
| 8 | X | | | X | | | | | X | YES | YES | LONG |
| 9 | | X | | | X | X | | | | NO | NO | |
| 10 | | X | | | X | | X | | | YES | YES | LONG |
| 11 | | X | | | X | | | X | | YES | YES | MOD |
| 12 | | X | | | X | | | | X | YES | YES | LONG |
| 13 | | X | | X | | X | | | | NO | NO | |
| 14 | | X | | X | | | X | | | YES | NO | |
| 15 | | X | | X | | | | X | | YES | YES | LONG |
| 16 | | X | | X | | | | | X | YES | NO | |
| 17 | | | X | | X | X | | | | NO | NO | |
| 18 | | | X | | X | | X | | | YES | YES | SHORT |
| 19 | | | X | | X | | | X | | YES | YES | NONE |
| 20 | | | X | | X | | | | X | YES | YES | MOD |
| 21 | | | X | X | | X | | | | NO | NO | |
| 22 | | | X | X | | | X | | | YES | NO | |
| 23 | | | X | X | | | | X | | YES | YES | SHORT |
| 24 | | | X | X | | | | | X | YES | YES | LONG |

Occupant A: No occupant present which applies to passenger side only.

Occupant B: Occupant Present and in-position with seat belt on.

Occupant C: Occupant present and in-position without seat belt on.

Occupant D: Occupant present but out-of-position.

Figure 8:
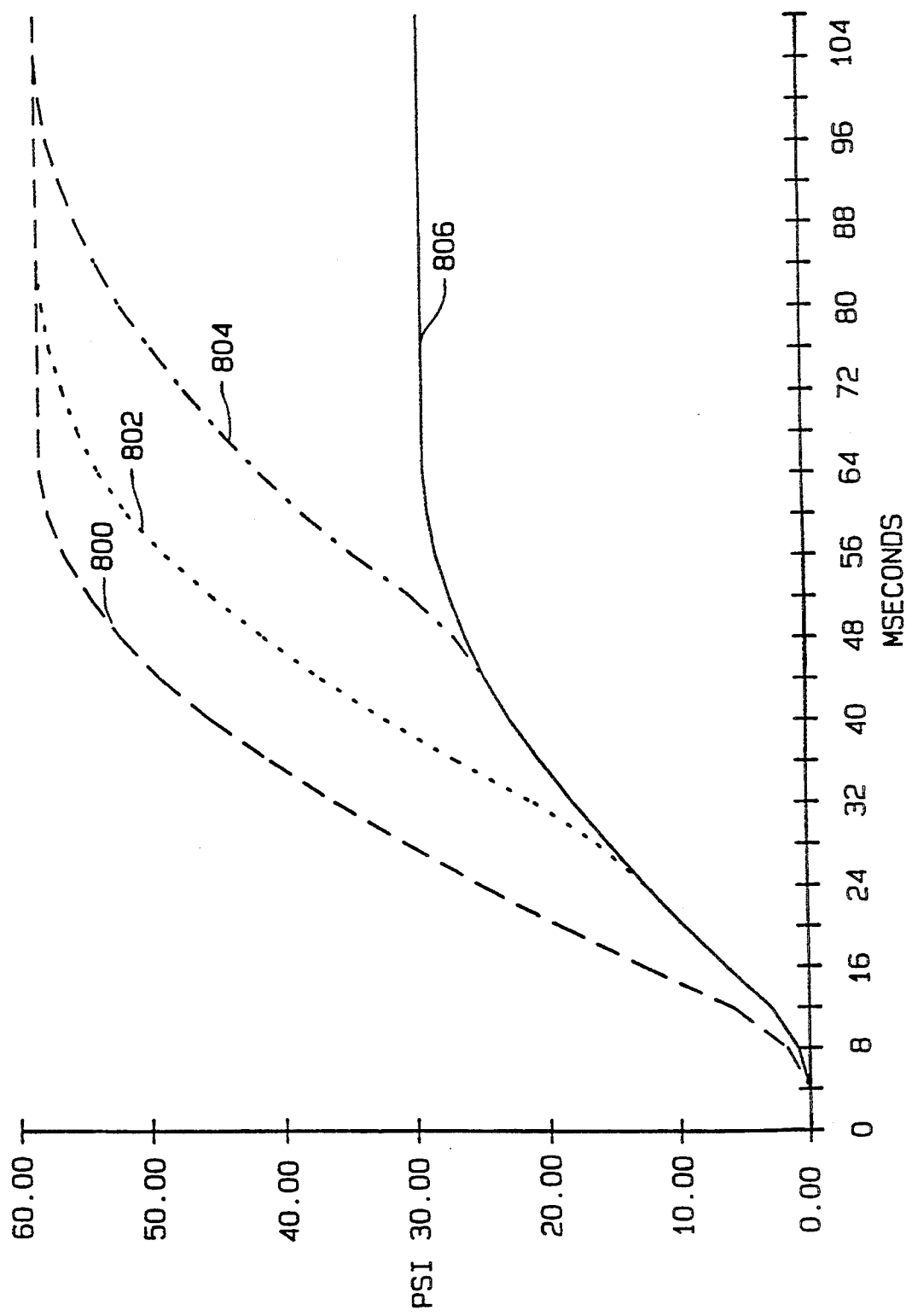
FIG. 8 is a graph illustrating example tank performances for a two-level gas generator showing the effects of various sequence delays between pulses.

FIG. 8 illustrates example tank performances for a two-level gas generator showing the effects of various sequence delays between pulses. Curve 806 illustrates low level inflation. Curve 800 illustrates dual level inflation with no delay. Curve 802 illustrates dual level inflation with 20 milliseconds delay. Curve 804 illustrates dual level inflation with 40 milliseconds delay. FIG. 9 illustrates mass flow rates for the curves of FIG. 8. Block 900 illustrates low level inflation. Block 902 illustrates dual level inflation with no delay. Block 904 illustrates dual level inflation with 20 milliseconds delay. Block 906 illustrates dual level inflation with 40 milliseconds delay.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An air bag system for a motor vehicle comprising:
at least one air bag module;
multiple level gas generation means coupled to each said at least one air bag module for generating a multiple level gas applied to said air bag module;
said multiple level gas generation means including at least one gas inflator for generating a low level gas and at least one gas inflator for generating a high level gas;
electronic control means for controlling said multiple level gas generation means;
temperature sensor means coupled to said electronic control means for sensing ambient temperature;

seat belt sensor means coupled to said electronic control means for sensing seat belt usage;

acceleration sensor means coupled to said electronic control means for sensing deceleration;

said electronic control means being responsive to a combination of sensed inputs from said temperature sensor means, said seat belt sensor means and said acceleration sensor means for determining an optimum gas generation level by selectively activating either said at least one low level gas generator, or both said at least one low level gas generator and said at least one high level gas generator and inflation sequence times for controlling said multiple level gas generation means for either activating said low level gas generator at a selected time; simultaneously activating said at least one low level gas generator and said at least one high level gas generator; or activating said at least one low level gas generator identifying a time delay and activating responsive to said identified time delay said at least one high level gas generator.

2. An air bag system as recited in claim 1 further including occupant sensor means coupled to said electronic control means and responsive to a sensed seat belt usage by said seat belt sensor means for sensing occupant presence.

3. An air bag system as recited in claim 2 wherein said electronic control means is responsive to said combination of sensed inputs further including a sensed input from said occupant sensor means.

4. An air bag system as recited in claim 2 further including occupant position sensor means coupled to said electronic control means and responsive to a sensed occupant for sensing occupant position.

5. An air bag system as recited in claim 4 wherein said electronic control is being responsive to said combination of sensed inputs further including sensed inputs from said occupant sensor means and said occupant position sensor means.

6. An air bag system as recited in claim 1 wherein said electronic control means includes means for determining crash severity responsive to a sensed input from said acceleration sensor means.

7. An air bag system as recited in claim 6 wherein said electronic control means includes means for determining velocity change of the vehicle passenger compartment.

8. An air bag system as recited in claim 7 wherein said electronic control means is responsive to said combination of sensed inputs and both said determined crash severity and velocity change.

9. An air bag system as recited in claim 1 further includes AC firing means coupled between said electronic control means and said multiple level gas generation means.

10. An air bag system as recited in claim 9 wherein said AC firing means includes a push pull transistor stage and a pair of capacitors coupled to said transistor stage and connected to said multiple level gas generation means.

11. An air bag system as recited in claim 1 further includes DC firing means coupled between said electronic control means and said multiple level gas generation means.

12. An air bag system as recited in claim 11 wherein said DC firing means includes an inductor, a high side output transistor stage and a low side output transistor stage coupled to said multiple level gas generation means.

13. An air bag system for a motor vehicle comprising:
at least one air bag module;

multiple level gas generation means coupled to each said at least one air bag module for generating a multiple level gas applied to said air bag module; said multiple level gas generation means including at least one low level gas generator and at least one high level gas generator;

electronic control means for controlling said multiple level gas generation means;

AC firing means coupled between said electronic control means and said multiple level gas generation means operatively controlled by said electronic control means for selectively activating said at least one low level gas generator and at least one high level gas generator;

temperature sensor means coupled to said electronic control means for sensing ambient temperature;

seat belt sensor means coupled to said electronic control means for sensing seat belt usage;

acceleration sensor means coupled to said electronic control means for sensing deceleration;

said electronic control means being responsive to a combination of sensed inputs from said temperature sensor means, said seat belt sensor means and said acceleration sensor means for selectively activating only said low level gas generator; simultaneously activating both said low level gas generator and said high level gas generator or activating said low level gas generator, identifying a time delay and activating said high level gas generator after said identified time delay.

14. An air bag system as recited in claim 13 wherein said AC firing means includes a push pull transistor stage and a pair of capacitors coupled to said transistor stage and connected to said multiple level gas generation means.

* * * * *

UNITED STATES PATENT AND TRADEMARK OFFICE
CERTIFICATE OF CORRECTION

PATENT NO. : 5,411,289

DATED : May 2, 1995

INVENTOR(S) : Smith et al.

It is certified that error appears in the above-identified patent and that said Letters Patent is hereby corrected as shown below:

On the title page, item

[73] After "Assignee: Morton International, Inc., Chicago, Ill"

insert --and ROBERT BOSCH GMBH, Stuttgart, Germany--

Signed and Sealed this

Ninth Day of January, 1996

Attest:

BRUCE LEHMAN

Attesting Officer — Commissioner of Patents and Trademarks